United States Patent Office 3,403,986
Patented Oct. 1, 1968

3,403,986
METHOD FOR THE OBTAINMENT OF URANIUM FLUORIDE
Maurice Delange, Mennecy, Henri Huet, Saint Vrain, and Paul Vertes, Antony, France, assignors to Commissariat à l'Energie Atomique, Paris, France, an organization of France
Continuation-in-part of application Ser. No. 102,740, Apr. 13, 1961. This application Mar. 29, 1965, Ser. No. 443,451
Claims priority, application France, Apr. 20, 1960, 824,748; Jan. 12, 1965, 1,620, Patent 1,267,178
2 Claims. (Cl. 23—353)

ABSTRACT OF THE DISCLOSURE

Hexavalent $UO_3$ is introduced in a continuous uninterrupted stream into a reduction zone where it is reduced to $UO_2$ which is then passed immediately into a hydrofluorination zone; both zones form a completely closed system but between the reduction zone and the hydrofluorination zone, the freshly formed $UO_2$ is cooled to a temperature of 200–300° C. thereby shifting the equilibrium to a complete conversion of HF while maintaining the $UO_2$ in highly reactive form. This avoids the need for removal of unreacted HF or for provision of a buffer zone between hydrofluorination and reduction zone.

---

This application is a continuation-in-part of our application Ser. No. 102,740, filed Apr. 13, 1961, now abandoned.

The present invention relates to a method for the manufacture of uranium fluoride by means of a stream of hydrofluoric acid gas flowing in countercurrent fashion through a mass of granular uranium oxide $UO_2$ travelling under the effect of gravity through a vertical hydrofluorination reactor to the bottom of which the stream of hydrofluoric acid is fed.

According to the present invention, said uranium oxide $UO_2$ is obtained by reduction of a mass of granular uranium oxide $UO_3$ travelling under the effect of gravity through a second vertical reactor located above the first one and the bottom of which communicates permanently with the top of the fluorination reactor, and said two vertical reactors are connected together, without any outflow of gas therefrom, the top of the hydrofluorination reactor unit forming a cooling zone adapted to ensure absorption of unreacted hydrofluoric acid gas by the granular mass travelling from the reduction reactor to the hydrofluorination reactor unit.

Thus, whereas the temperature in the main zone of the hydrofluorination reactor unit may be as high as 500–600° C., this temperature is reduced to 200–300° C. in the top cooling zone opening into the reduction reactor bottom.

In these conditions, the only gaseous product flowing out from said cooling zone at the top thereof is water vapor which passes into the reduction reactor where it contributes in lowering the temperature at the bottom thereof.

According to another feature of the invention we provide means responsive to the temperature of the granular material flowing down through the cooling upper zone of the hydrofluorination reactor for controlling one of the factors determining the hydrofluorination reaction and in particular the flow rate of hydrofluoric acid fed to said hydrofluorination reactor.

Preferred embodiments of the present invention will be hereinafter described with reference to the appended drawings, given merely by way of example, and in which.

Figure 1:
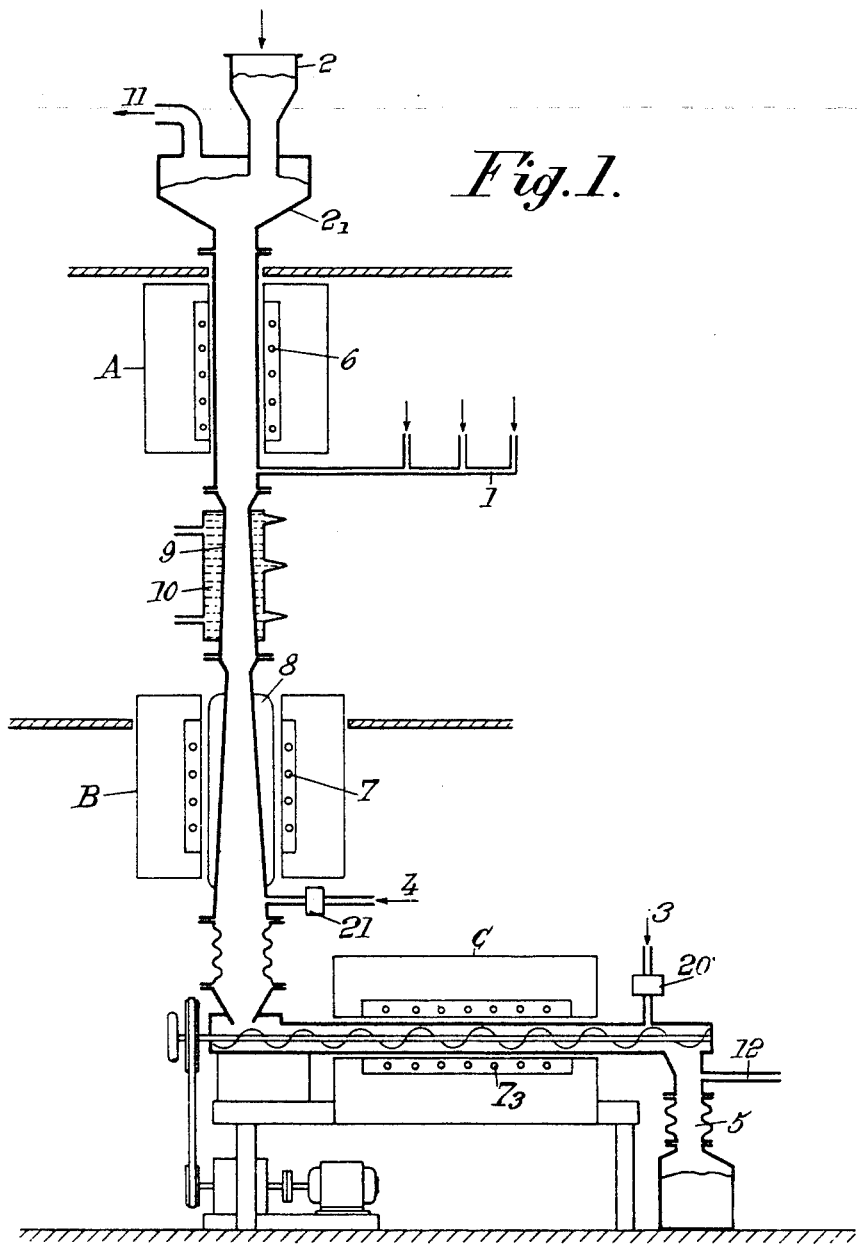
FIG. 1 is a diagrammatic vertical sectional view of a plant for the obtainment of uranium fluoride according to the present invention.

A plant for carrying out the method according to the present invention, as illustrated by FIG. 1, comprises:

(a) on the one hand, at the top, a reduction reactor A receiving at 2, through a hopper $2_1$, uranium oxide $UO_3$ so as to transform it, under the action of a reducing gas (hydrogen and/or ammonia, for instance) arriving at 1 and flowing out at 11, into uranium oxide $UO_2$, an electric heating being provided at 6 to ensure for instance a reduction temperature of the order of 600° C.–700° C., and (b) on the other hand, under reactor A the hydrofluorination means comprising essentially a vertical reactor B and a horizontal reactor C in series therewith, these reactors being heated at 7 and $7_3$, respectively. The horizontal reactor C is a furnace provided with an endless screw for conveying $UF_4$ toward a receiver 5. Hydrofluoric acid is fed both at 3 to the bottom of reactor C and at 4 to the bottom of reactor B, for instance at the rate of ⅔ of the total feed at 3 and ⅓ thereof at 4. Valves, such as 20 and 21 are provided to adjust the amount of HF gas fed to the circuit.

The top of vertical reactor B carries an extension 9 of conical shape tapering toward the top, in combination with cooling means 10 for absorbing, according to the present invention, the residual hydrofluoric acid gas so that only the stoichiometric proportion thereof is used.

A device 8, comprising for instance cooling blades, may be provided on said reactor B to ensure a first cooling in the main portion of the reactor.

The operation takes places as follows:

Uranium oxide in the form of grains, delivered from the bottom of reducing reactor A, reacts, in the hydrofluorination means according to the balanced reaction:

$$UO_2 + 4HF \rightleftarrows UF_4 + 2H_2O$$

The state of equilibrium depends essentially upon the temperature. From the curve of the concentration of HF in the gaseous phase plotted as a function of the temperature, it is seen that this concentration, which reaches 27.4% at 550° C., drops to only 1.4% at 200° C.

But the speeds of treatment also depend upon the temperature, so that it is practically impossible to work at 200° C., the speed of reaction being too low at this temperature.

It is therefore necessary, in order to ensure the best possible utilization of HF in conditions close to the stoichiometric conditions, to provide a compromise between the speed of reaction and the temperature, that is to say:

To provide in the most active portion of the treatment apparatus, in particular in the extraction reactor C and in the vertical reactor B proper, high temperatures of the order of 500–600° C.

But to provide between the top of reactor B and the bottom of reduction reactor A, in the extension 9 above 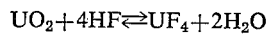 reactor B, cooling means 10 such that the temperature drops to a relatively low value of the order for instance of 200° C., from the top end of reactor B, to the bottom end of reactor A.

Figure 2:
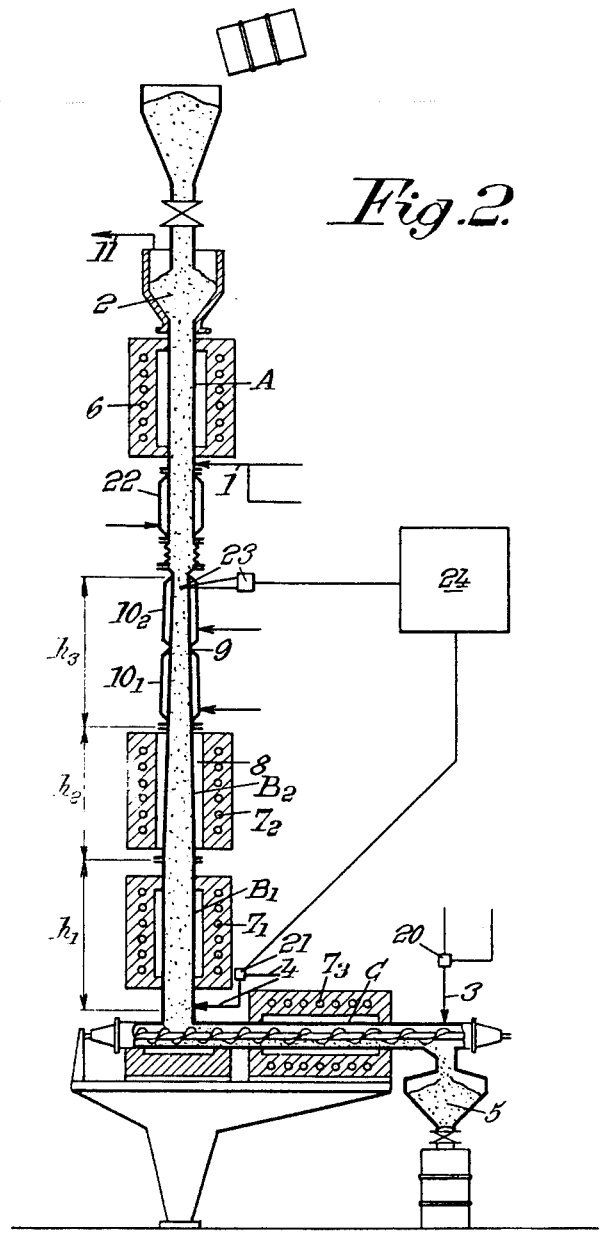
FIG. 2 is a similar view of another embodiment of such a plant.

Preferably, as illustrated by FIG. 2, said cooling means consist of several elements corresponding to different temperature ranges, the times for which the solid matters remain in said ranges being chosen in accordance with the speeds of treatment at the temperatures that are considered.

For instance we provide, as shown by FIG. 2, above vertical reactor $B_1$, provided with its heating coil $7_1$:

First a zone $B_2$ about which, initially, heating means $7_2$ may be provided, said means being subsequently removed or moved away in such manner that said zone $B_2$, which may be provided with cooling blades, can have a cooling action, reducing the temperature to values of the order of 400–450° C., Then a zone 9 where the temperature decreases from 400° C. down to 200° C., and even 150° C., under the effect of several cooling devices, such as $10_1$ and $10_2$ disposed at different levels. For instance the first cooling device $10_1$ is fed with steam at 6 kgs./cm.², whereas the second one, $10_2$, is fed with steam at 2 kgs./cm.².

Figure 3:
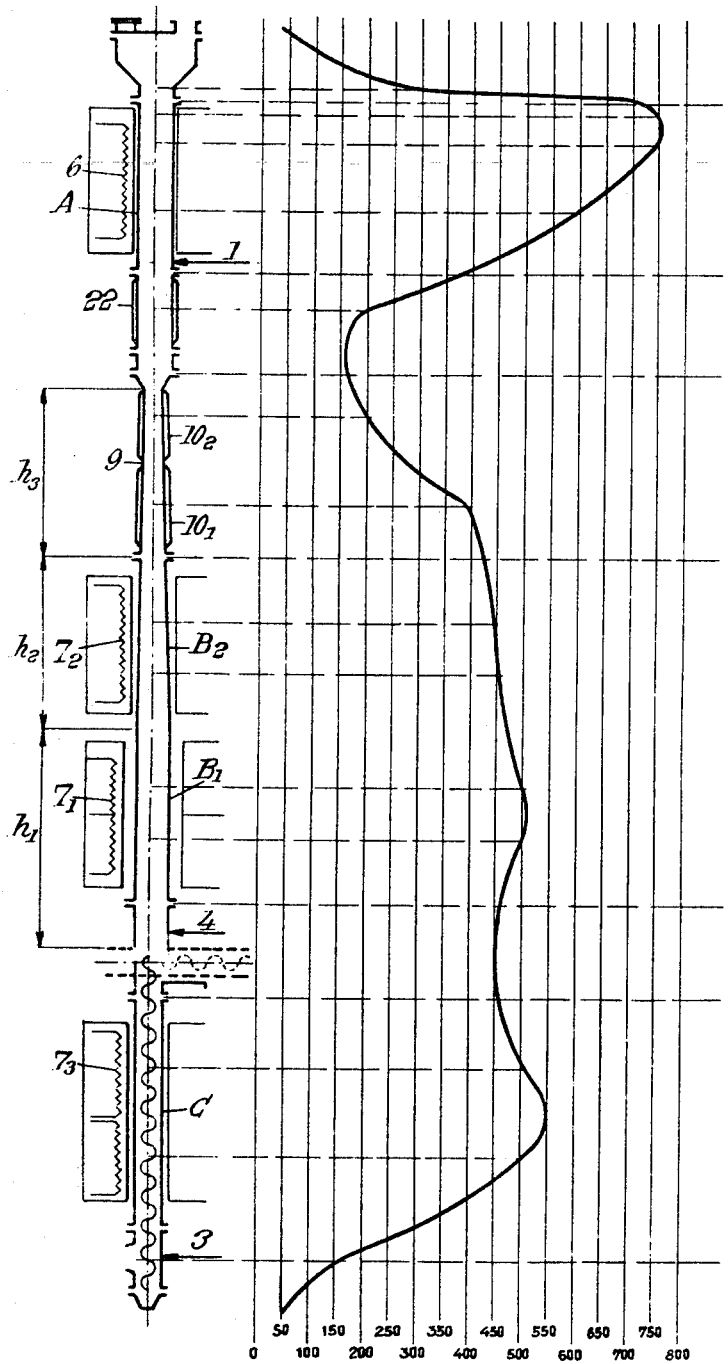
FIG. 3 is a diagram showing the evolution of the temperature from one end of the plant to the other end.

FIG. 3 shows the temperature diagram in the system of FIG. 2. This system is supposed to be provided for a production of about 50 kgs. of $UF_4$ per hour. The cross sections, in square decimeters, are of the order of 2.4 for extraction reactor C (with a rate of filling of ⅔) and vary in reactor elements $B_1$, $B_2$ and 9, from 4.9 at the bottom of $B_1$ to about 1.8 or 2 at the upper end of 9.

The time for which the matters remain in portion $B_1$ is about 2.40 hours. It drops to 2 hours in portion $B_2$ and then to values ranging from 0.70 hour to 1 hour in portion 9. In particular the time for which the matters remain at temperature $t_1$, reached the opposite $10_1$ is about 0.40 hour, and is 0.30 hour at the lowest temperature $t_2$ reached opposite $10_2$.

The dimensions which, account being taken of the conical shape of the elements, would correspond to these times of treatment, are as follows: The respective heights of portions $h_1$, $h_2$ and $h_3$ are of the same order of magnitude, that is to say 1.70 m., 1.40 m. and 1.40 m., respectively. The length of the extraction reactor C is a little greater.

In this way, it is possible to use practically the whole of the hydrofluoric acid fed to the system, so that the gaseous stream issuing from the fluorination unit and passed to the reduction reactor A contains only water vapor and, of course, the reducing gas, such as hydrogen and/or ammonia, introduced at 1.

The presence of this water vapor contributes in cooling down the granular material issuing from the reduction reactor A. A supplementary cooling, for instance by means of a water jacket, may be provided at 22.

Thus we dispense with means, located between the reduction reactor, and the hydrofluorination unit, for recovering an excess of hydrofluoric acid gas, as this was the case in prior systems. Furthermore the gaseous stream issuing from the hydrofluorination unit consists of water vapor used for useful purposes.

It may however happen that the temperature at the top of portion 9 and the total flow rate of HF fed to the system do not quite correspond to each other, in particular due to variations in the nature and the grain sizes of the uranium oxide.

Therefore, we advantageously provide, according to another feature of our invention, means responsive to the temperature of the solid material entering the hydrofluorination unit for acting upon the parameters of the reactions taking place in the system in particular:

Either upon the flow rate of hydrofluoric acid gas fed at 4, at the bottom of the vertical hydrofluorination reactor, Or, upon the rate of circulation of the solid material and in particular upon the speed of revolution of the extractor screw of horizontal reactor C.

If we act upon the flow rate of hydrofluoric acid gas entering at 4, that is to say upon ⅓ of the total flow rate (whereas the remainder, fed at 3, is fixed) we provide for this purpose a pyrometer 23 disposed to measure the temperature in the mass of uranium oxide entering the portion 9 of the hydrofluorination system and the electric voltage thus obtained is made to act upon a control apparatus 24 (FIG. 2) capable of controlling in a suitable manner the valve 21 which controls the HF inflow through 4 in such manner that:

Any rise of this temperature above a predetermined limit produces a reduction of the HF flow rate at 4, and A reduction of this temperature below this limit produces an increase of the HF flow rate at 4.

Figure 4:
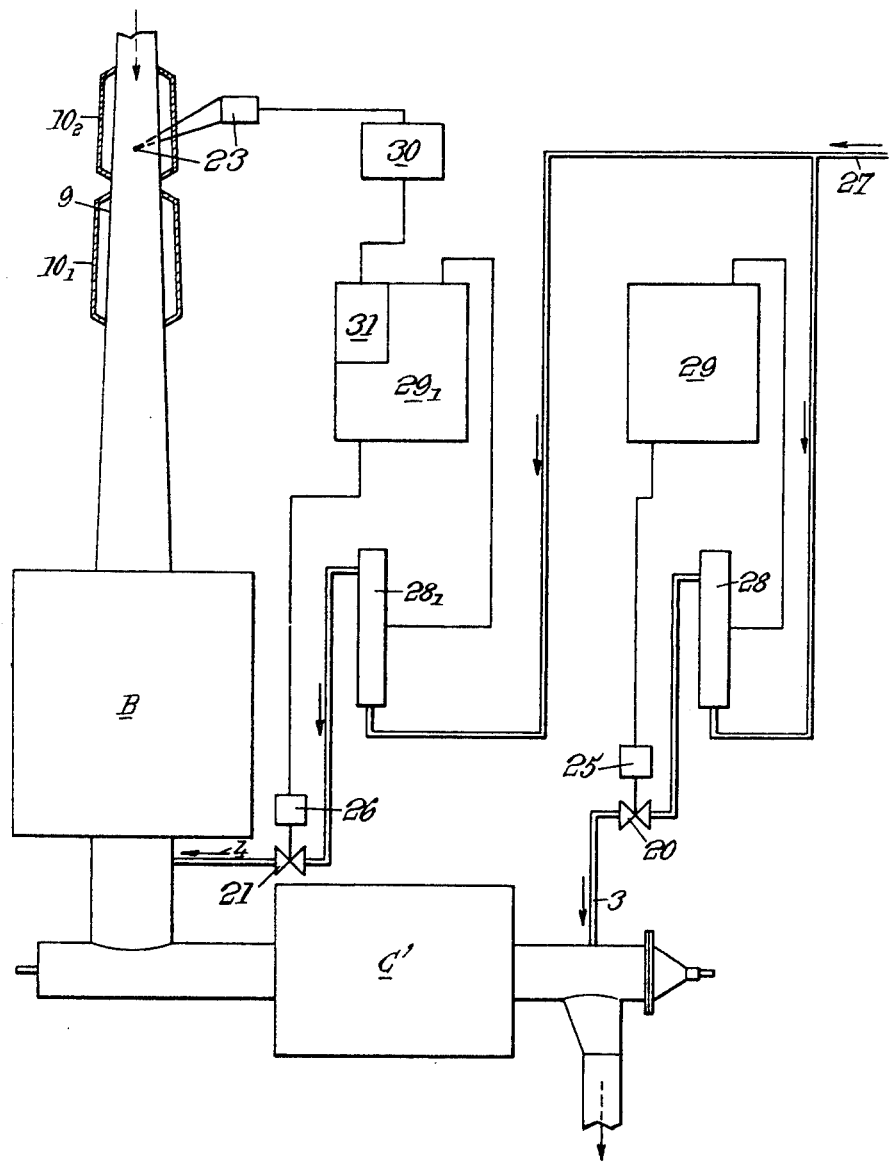
FIG. 4 illustrates separately on an enlarged scale, some features of the invention.

This control is preferably effected in an automatic fashion through apparatus such as illustrated by FIG. 4.

In this embodiment of our invention, valves 20 and 21 are of the type pneumatically operated by means of diaphragms 25 and 26, respectively.

Valve 20 is to be adjusted for a predetermined and constant value of the flow rate therethrough (as a rule ⅔ of the total flow rate). It is connected to feed conduit 27 through a flowmeter 25 of a known type transmitting pulses to an electric receiver 29.

This receiver is of the indicating and recording type. It records the pulses from flowmeter 25, that is to say the values of the flow rate, upon a circular diagram, for instance within a range from 700 to 7,000 liters per hour and it transmits a corresponding pneumatic signal to the control diaphragm 25. Therefore it acts as a mere regulating device so as finally to adjust valve 25 to a position, corresponding to a predetermined value of the flow rate, that is to say to a predetermined position of an index with respect to said diagram.

Valve 21 is adjusted in an analogous manner, through means shown at $28_1$, $29_1$ but, in addition, receiver $29_1$ is placed under the control of means responsive to variations of the temperature value given by pyrometer 23.

Said means comprise, on the one hand, a converter device 30 capable of transforming the electric signals supplied by pyrometer 23 into proportional pneumatic signals and on the other hand, operative by said pneumatic signals, an auxiliary receiver 31 incorporated in receiver $29_1$ for displacing the adjustment indicating index thereof, and therefore the HF flow rate determined by valve 21, in response to variations of the temperature measured by pyrometer 23.

In a general manner, while we have in the above description disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A method of producing uranium fluoride which comprises continuously feeding a granular mass of uranium oxide $UO_3$ at the top of a first vertical reactor to travel therethrough by gravity, while feeding a stream of reducing gas at the bottom end of said first vertical reactor so that said granular mass and said gas stream travel in countercurrent fashion through said first reactor and a granular mass of uranium oxide $UO_2$ is obtained at the bottom end of said first reactor, immediately passing continuously said granular mass of $UO_2$ downwardly by gravity through a vertical cooling zone located under said first reactor bottom end, maintaining said cooling zone at a temperature ranging from 150 to 300° C., passing said granular mass leaving said cooling zone immediately into the top end of a second vertical reactor so that the mass can travel downwardly by gravity through said second reactor, maintaining said second reactor at a temperature of 400° C. to 550° C., continuously feeding a stream of hydrofluoric acid gas HF into the bottom end of said second reactor so that said granular mass and said gas stream travel in countercurrent fashion through said second reactor, passing the whole of said gas stream from the top end of said second reactor to the bottom end of said cooling zone, said cooling zone being chosen of sufficient length and sufficiently cooled to ensure absorption of unreacted hydrofluoric acid gas by the granular mass travelling therethrough toward said second furnace, and passing the whole of the gaseous stream at the top of said cooling zone into the bottom of said first vertical reactor.

2. A method of producing uranium fluoride which comprises continuously feeding a granular mass of uranium oxide $UO_3$ at the top of a first vertical reactor to travel therethrough by gravity, while feeding a stream of reducing gas at the bottom end of said first vertical reactor so that said granular mass and said gas stream travel in countercurrent fashion through said first reactor and a granular mass of uranium oxide $UO_2$ is obtained at the bottom end of said first reactor, immediately passing continuously said granular mass of $UO_2$ downwardly by gravity through a vertical cooling zone located under said first reactor bottom end, maintaining said cooling zone at a temperature ranging from 150 to 300° C., passing said granular mass leaving said cooling zone immediately into the top end of a second vertical reactor so that the mass can travel downwardly by gravity through said second reactor, maintaining said second reactor at a temperature of 400° to 550° C., continuously feeding a stream of hydrofluoric acid gas HF into the bottom end of said second reactor so that said granular mass and said gas stream travel in countercurrent fashion through said second reactor, passing the whole of said gas stream from the top end of said second reactor to the bottom end of said cooling zone, said cooling zone being chosen of sufficient length and sufficiently cooled to ensure absorption of unreacted hydrofluoric acid gas by the granular mass travelling therethrough toward said second reactor, passing the whole of the gaseous stream at the top of said cooling zone into the bottom of said first vertical reactor, passing continuously the solid material from the bottom of said second reactor into one end of a horizontal reactor connected to the bottom of said second reactor maintaining said horizontal reactor at a temperature of from 450 to 600° C., continuously feeding a stream of hydrofluoric acid gas to the other end of said horizontal reactor, and collecting solid uranium fluoride at said other end of said horizontal reactor.

References Cited

Second Geneva Conference on Peaceful Use of Atomic Energy, vol. 4, September 1958, Arnold, pp. 139–152.

CARL D. QUARFORTH, *Primary Examiner.*

R. L. GRUDZIECKI, *Assistant Examiner.*